United States Patent [19]

Ambrose

[11] 4,354,329
[45] Oct. 19, 1982

[54] LOADER FOR GRINDING MACHINE

[75] Inventor: Lawrence A. Ambrose, Springfield, Vt.

[73] Assignee: Bryant Grinder Corporation, Springfield, Vt.

[21] Appl. No.: 189,533

[22] Filed: Sep. 22, 1980

[51] Int. Cl.³ .................... B23Q 7/04; B65G 47/06
[52] U.S. Cl. .................... 51/215 H; 414/225; 414/751; 221/267
[58] Field of Search .......... 51/215 R, 215 CP, 215 H, 51/215 CP; 414/751, 225, 14, 17, 18, 749; 198/486; 294/99 R; 221/267, 268

[56] References Cited

U.S. PATENT DOCUMENTS

| | | | |
|---|---|---|---|
| 1,980,440 | 11/1934 | Rupple | 51/215 H |
| 2,608,746 | 9/1952 | Harney | 414/17 |
| 2,649,032 | 8/1953 | Moncrieff | 51/215 H |
| 2,692,535 | 10/1954 | Praeg | 51/215 H |
| 2,783,897 | 3/1957 | Farquharson | 221/267 |
| 2,829,918 | 4/1958 | Stoakes et al. | 294/99 R |
| 3,541,921 | 11/1970 | Helfer et al. | 414/225 |

*Primary Examiner*—Stephen G. Kunin
*Assistant Examiner*—Robert A. Rose

*Attorney, Agent, or Firm*—Reising, Ethington, Barnard, Perry & Brooks

[57] ABSTRACT

A loader (10) for a grinding machine includes a loading member (30) with at least one resilient finger (32) thereon for gripping a workpiece (14) to be ground by movement of the loading member in a loading direction as a resiliently biased workpiece positioner (34) initially counteracts force applied to the workpiece by finger deflection. Continued movement of the loading member (30) after the gripping first moves the workpiece positioner to a nonblocking position and thereafter moves the workpiece to an associated grinding machine. Preferably, a pair of the fingers (32) and a rigid locator (44) cooperate to position and grip a joint race (14) of an annular shape with ball grooves to be ground. A pair of spring biased blocking members (34) preferably embody the workpiece positioner and are pivotally mounted in alignment with a hopper (16) in which workpieces to be ground are stocked. The loading member (30) is supported on a movable carriage (150) that is pivotal about a vertical axis on a fixed base (148) between use and access positions. An unloading chute (20) also supported on the fixed base has a movable floor section (182) that is extended to receive each workpiece after it is ground and thereafter retracted to prevent interference with the grinding wheel during the next cycle.

17 Claims, 8 Drawing Figures

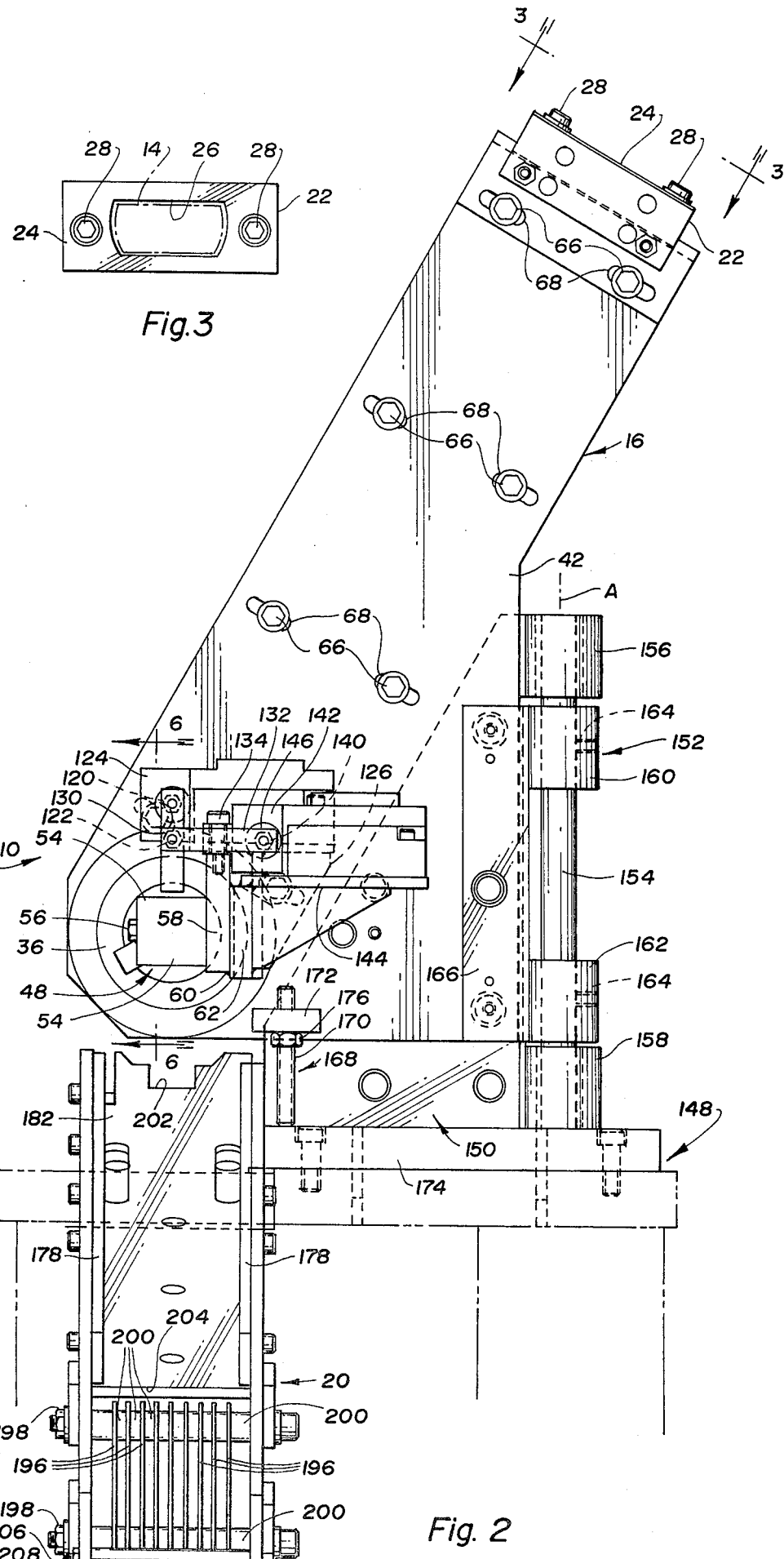

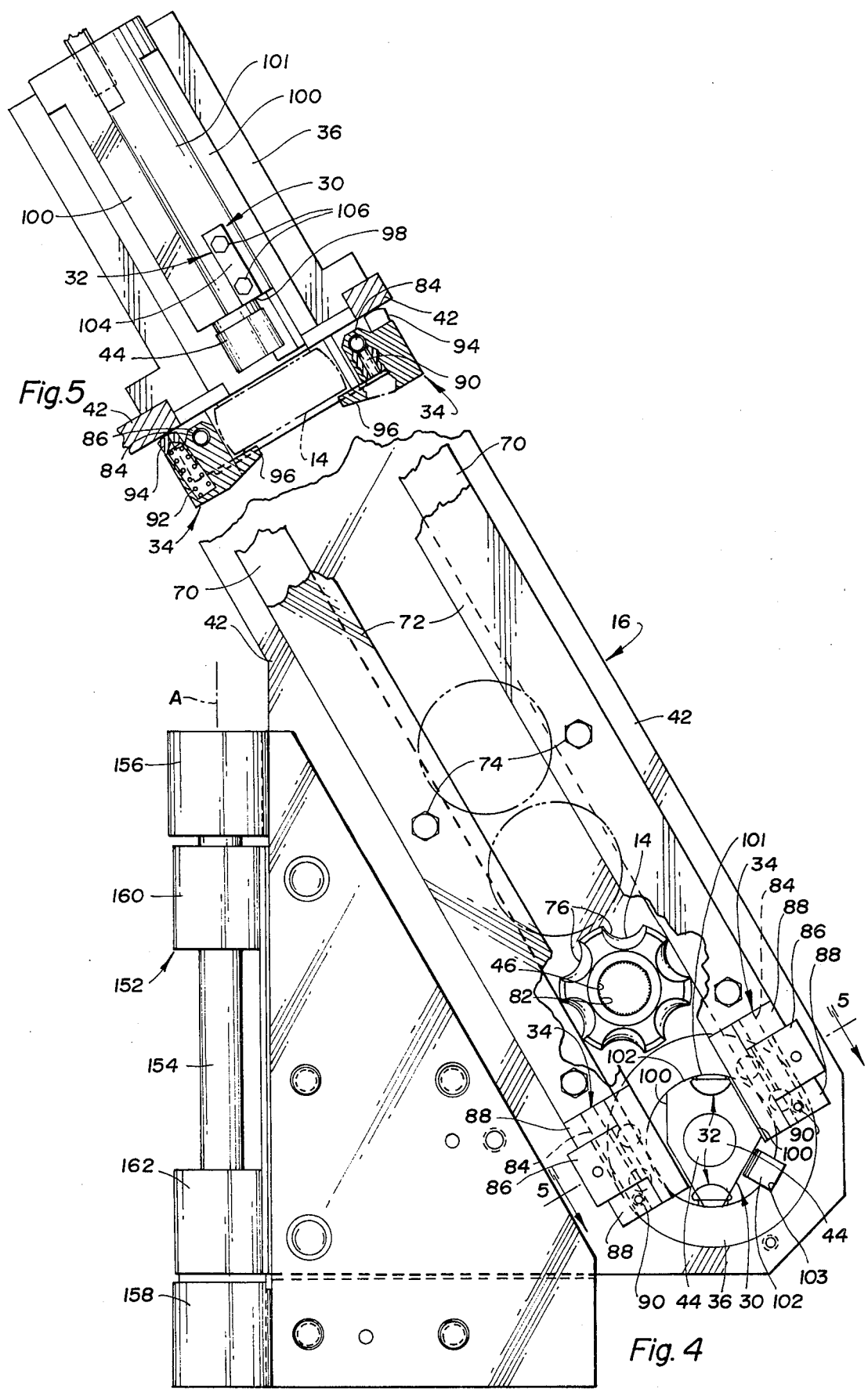

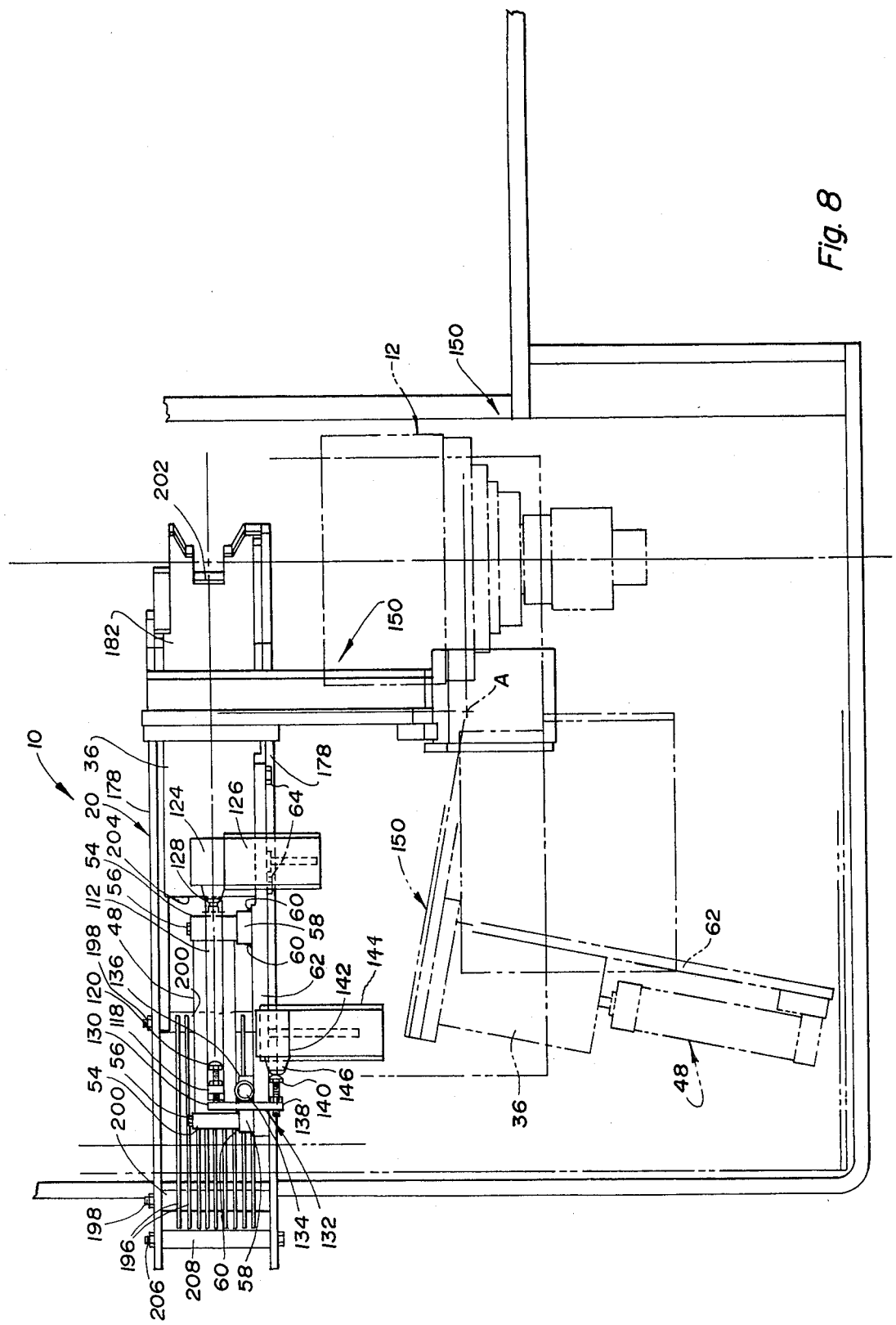

LOADER FOR GRINDING MACHINE

TECHNICAL FIELD

This invention relates to a grinding machine loader for loading workpieces to be ground and has particular utility when used with a grinding machine that grinds inner races for constant velocity universal joints.

BACKGROUND ART

Production grinding machines are preferably automatically loaded without requiring any manual operation so as to decrease production costs and to also decrease cycle time with a concomitant increase in output. Loaders for loading grinding machines also preferably provide an unloading operation after grinding is completed. As with any automated equipment, grinding machine loaders preferably require infrequent maintenance so as to increase production output and lessen the unit cost of ground workpieces.

Inner races for constant velocity universal joints have annular shapes with circumferentially spaced grooves for receiving ball elements that provide connection thereof with grooved outer races in order to provide constant angular velocity between driving and driven shafts respectively connected to the races. The grooves in such inner races face outwardly and must be ground to a relatively precise tolerance, on the order of one to several ten-thousandths of an inch, in order to maintain ball element positioning that results in constant velocity driving and uniform torque sharing without overloading one or more of the ball elements.

DISCLOSURE OF INVENTION

An object of the present invention is to provide an improved grinding machine loader with relatively few moving parts so as to insure effective performance with minimum maintenance.

In carrying out the above object, a grinding machine loader constructed in accordance with the invention includes a loading member with a resilient finger that deflects to grip a workpiece to be ground and also includes a movable workpiece positioner that is resiliently biased with a sufficient force to counteract the force applied to the workpiece by the finger deflection such that the positioner blocks movement of the workpiece during the initial gripping thereof by the finger. Subsequent movement of the loading member in a loading direction after the initial gripping provides loading of the workpiece in preparation for grinding thereof by a grinding machine with which the loader is utilized.

The loader preferably includes a cylinder having a piston connecting rod that is extended to move the loading member in the loading direction. Retraction of the rod by the cylinder moves the loading member in an opposite direction after the loading in preparation for the grinding operation.

A hopper of the loader feeds workpieces to be ground into alignment with the loading member with the piston connecting rod of the cylinder in its retracted position. Thereafter, extension of the connecting rod moves the loading member toward the workpiece aligned therewith to initially provide the finger gripping and subsequently move the workpiece against the bias of the positioner to the associated grinding machine for loading thereof prior to the grinding. A slide surface on the loading member is slidably engaged by the next workpiece within the hopper during the extending movement of the connecting rod that loads the prior workpiece. After retraction of the connecting rod, the next workpiece within the hopper then moves into alignment with the loading member in preparation for grinding. An orienter of the hopper insures that workpieces are properly oriented upon stocking the hopper, which is an advantageous feature when the loader is utilized to load constant velocity universal joints which is a use for which this loader has particular utility.

In its preferred construction, the loader includes a fixed base, and a movable carriage that supports the loading member cylinder and the hopper. A pivotal connection of the loader supports the carriage on the fixed base for movement about a vertical axis between a use position and an access position that allows access to the grinding machine with which the loader is used. A vertical adjuster extends between the carriage and the fixed base in the use position of the carriage in order to provide vertical adjustment for aligning the hopper with the grinding machine such that the loaded workpieces are accurately positioned in preparation for the grinding.

The loading member preferably includes a rigid locator that cooperates with the resilient finger to grip the workpiece in an accurately positioned manner. A pair of the resilient fingers are most preferably provided on the loading member so as to cooperate with the locator to grip the workpiece during the loading member movement in the loading direction. Each resilient finger includes an end mounted on the loading member, an intermediate portion of a reduced size, and a distal end with a curved surface espcially adapted to be received within and grip a ball groove of an inner face for a constant velocity universal joint.

The workpiece positioner for stopping workpiece movement as the initial gripping takes place preferably includes a blocking member and a spring that biases the blocking member to a blocking position with respect to the workpiece in the hopper. Deflection of the blocking member spring permits movement of the blocking member to a nonblocking position as the gripped workpiece is moved in the loading direction by the loading member whose movement is preferably provided by the extension of the cylinder rod. As disclosed, a pair of the blocking members are mounted on the hopper in a spaced relationship with respect to each other. Each of the blocking members has a spring and plunger construction that provides the biasing thereof to the blocking position and the deflection that permits the blocking member movement to the nonblocking position such that the gripped workpiece can be moved by the loading member for the loading in preparation for grinding.

The loading member also preferably includes an unloading chute having a floor section that is movable to an unload position to receive a ground workpiece from the associated grinding machine, and this movable floor section of the chute is thereafter moved back to a retracted position in preparation for the grinding of the next workpiece. Such movement of the chute floor section ensures that the ground workpiece will be received thereby during the unloading while still being out of the way during each grinding operation. Movement of the chute floor section is preferably provided by an unloading cyliner having a piston connecting rod whose extending and retracting movement provides the positioning in either the unload or retracted position. Vertically extending plates of a fixed floor section of the chute are spaced from each other and cooperate to define a workpiece slideway that drains grinding lubricant received by the chute during the unloading operation such that the lubricant does not drain into a storage bin or other container to which the ground workpieces are fed. The cylinder operation moves the movable floor section with respect to the fixed floor section upon movement between the retracted and extended positions.

The above object and other objects of the present invention are readily apparent from the following detailed description of the best mode for carrying out the invention when taken in connection with the accompanying drawings.

BRIEF DESCRIPTION OF DRAWINGS

FIG. 2 is an elevation view of the loader taken along line 2—2 of FIG. 1 and illustrating a hopper and an unloading chute thereof;

FIG. 3 is a view of the hopper taken along line 3—3 of FIG. 2 and illustrating an orientor for ensuring that workpieces to be loaded are positioned within the hopper in the proper orientation;

FIG. 4 is an elevation view of the loader taken along line 4—4 of FIG. 1;

FIG. 5 is a sectional view of the loader taken along line 5—5 of FIG. 4 and illustrating blocking members that provide a positioner for locating workpieces within the hopper during gripping thereof by a loading member of the loader;

FIG. 8 is a plan view of the loader taken along line 8—8 of FIG. 1.

BEST MODE FOR CARRYING OUT THE INVENTION

Figure 1:
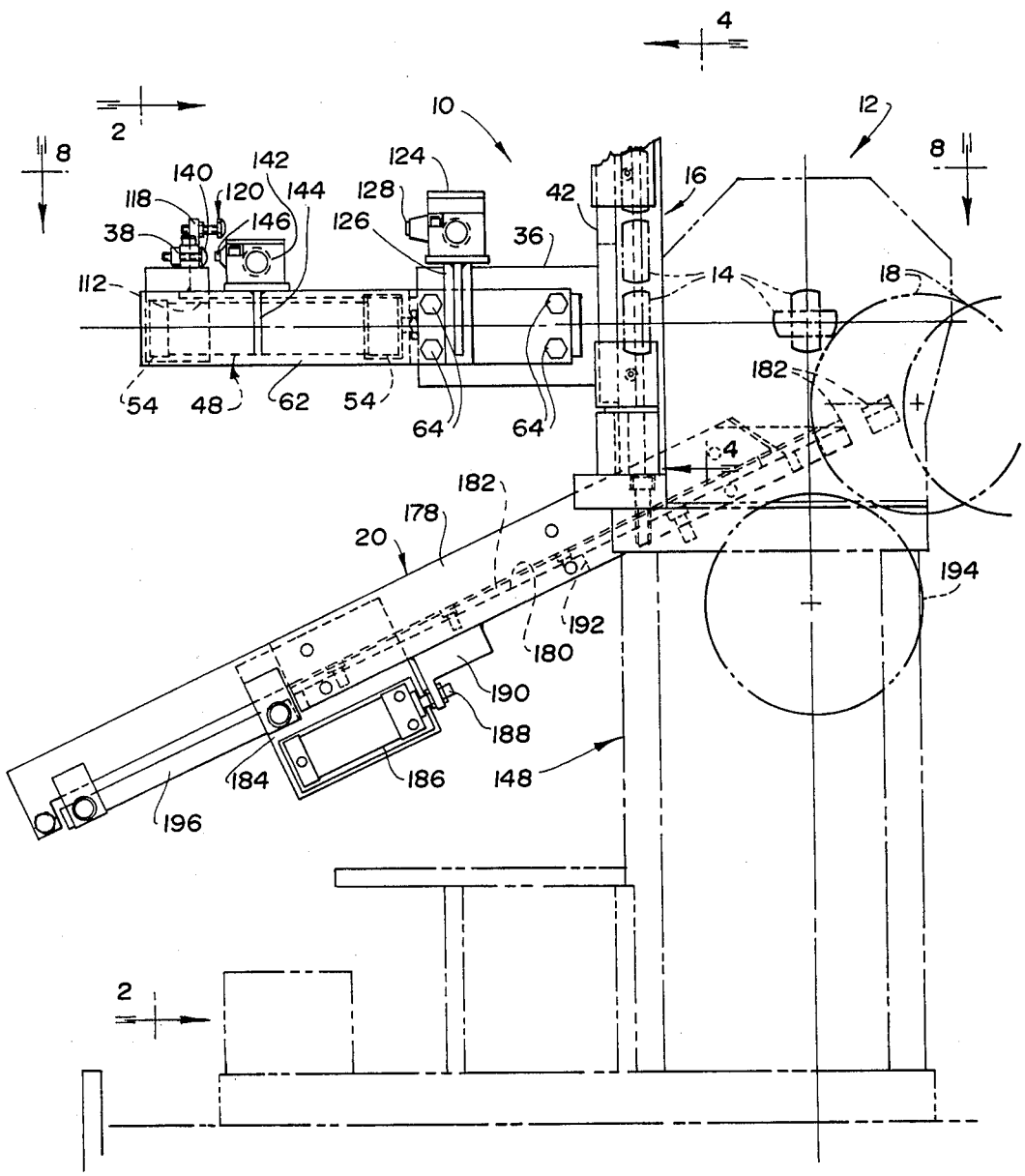
FIG. 1 is an elevation view of a grinding machine loader constructed in accordance with the present invention.

Referring to FIG. 1 of the drawings, a grinding machine loader constructed in accordance with the present invention is indicated generally by reference numeral 10 and is utilized with a grinding machine 12 illustrated by phantom line representation, Workpieces 14 stored in a hopper 16 of the loader are individually fed during operation to the grinding machine 12 in preparation for grinding. A grinding wheel 18 of grinding machine 12 is positioned to the right during the loading operation and is thereafter movable toward the left so as to be engageable with the loaded workpiece 14. As illustrated, the loader 10 is especially designed to load inner races of constant velocity universal joints whose annular shapes extend in a vertical plane within the hopper and whose circumferential ball grooves are ground by the grinding wheel 18 during the grinding operation. Upon loading, each race 14 is clamped by a rotatable holder of the grinding machine initially with its annular shape extending in a vertical plane prior to rotation thereof along with rotation of the grinding wheel 18 such that engagement of the grinding wheel with a pair of diametrically opposite ball grooves of the race provides precise grinding. Grinding wheel 18 is moved toward the right to permit indexing of the race 14 such that each pair of ball grooves can be ground. After all of the ball grooves of the race are ground, the grinding wheel 18 is moved toward the right and the workpiece holder of the grinding machine is stopped such that the race 14 is oriented so its annular shape extends in a horizontal plane and unclamping thereof allows an unloading chute 20 of the loader to receive the ground race for transfer to a storage bin or container in a manner which is hereinafter described.

With reference to FIGS. 2 and 3, the upper end 22 of hopper 16 includes an orienter 24 through which the workpiece races 14 are stocked within the hopper so as to ensure that the workpieces are properly oriented for loading. An opening 26 within the orienter 24 is located between attachment bolts 28 thereof and has a shape that prevents the workpiece race 14 with its unsymmetrical partially circular side shape from being loaded 180° from its proper position.

Figure 6:
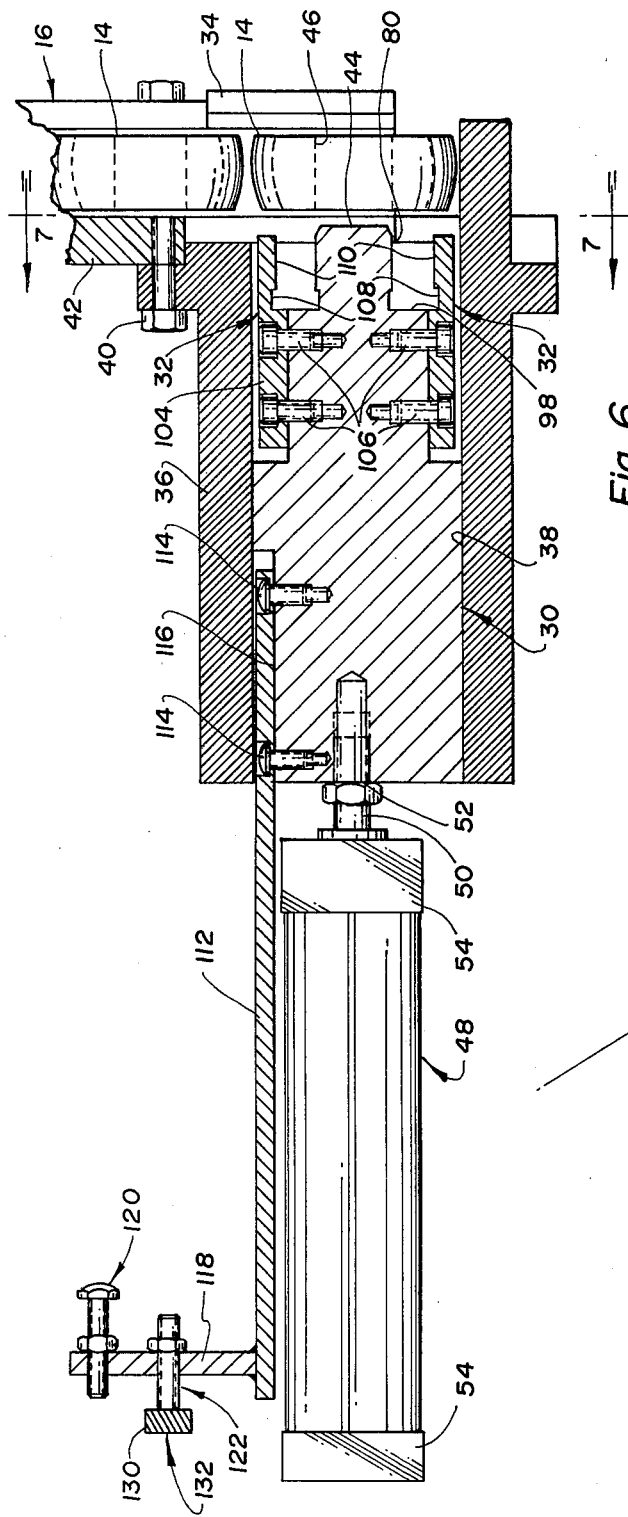
FIG. 6 is a sectional view through the loader taken along line 6—6 of FIG. 2 and illustrates a resilient finger and rigid locator construction that is utilized to grip the workpieces in cooperation with the positioner illustrated in FIG. 5.

With reference to FIGS. 4, 5, and 6, loader 10 includes a loading member 30 having a pair of resilient fingers 32, and the loader also includes a workpiece positioner embodied by a pair of movable blocking members 34 all of which cooperate to provide loading of the workpiece races 14 from the hopper to the grinding machine during the grinding operation previously described. As seen best in FIG. 6, loading member 30 is slidably supported by a housing 36 within a bore 38 thereof for movement toward the right in a loading direction and retracting movement toward the left after a loading operation has been performed. Nut and bolt connections 40 secure the loading member housing 36 to a housing 42 of the hopper which feeds the workpiece races 14 into alignment with the path of loading member movement such that a race is moved by the loading member to the grinding machine during each extending movement thereof toward the right in the loading direction.

During movement of the loading member 30 toward the right as viewed in FIG. 6, the resilient fingers 32 engage the aligned workpiece race 14 and deflect in order to provide gripping of the workpiece. Initially the finger deflection tends to move the workpiece race 14 being gripped toward the right but is resisted by a resilient biasing of the blocking members 34 (FIG. 5) that provide the workpiece positioner. After the race 14 has been gripped by the resilient fingers 32, continued movement of the loading member 30 toward the right overcomes the resilient bias of the blocking members 34 and pivots the blocking members 34 from the blocking positions shown in FIG. 5 to nonblocking positions such that the race can pass therebeween and move to the associated grinding machine for the grinding. A rigid locator 44 of the loading member is received within a central opening 46 of the race 14 prior to gripping thereof by the resilient fingers 32 so as to ensure proper location of the race upon loading thereof for grinding by the grinding machine.

Movement of the loading member 30 is provided by a fluid actuated cylinder 48 whose piston connecting rod 50 shown in FIG. 6 is secured to the loading member by a threaded stud and nut connection 52. Square end plates 54 of cylinder 48 are secured in any suitable manner such as by connection bolts 56 (FIG. 2) to associated mounts 58 which are secured by welds 60 to a horizontally extending arm 62. As seen in FIG. 1, arm 62 has its right end secured by connection bolts 64 to the loading member housing 36 such that cylinder 48 is fixed with respect thereto and extension and retraction of its piston connecting rod 50 illustrated in FIG. 6 provides the movement of the loading member 30 previously described.

Hopper 16 illustrated in FIG. 2 has bolts 66 extending through slots 68 in housing 42 to secure a pair of elongated plates 70 shown in FIG. 4 in a spaced relationship to each other so as to receive the workpiece races 14 therebetween upon stocking of the hopper. A pair of elongated flanges 72 are secured to the plates 70 by associated bolts 74 in order to cooperate with the plates 70 in defining a channel through which workpiece races 14 are stocked by the hopper for downward movement into alignment with the loading member 30 for the loading operation as previously described. Blocking members 34 define extensions of the flanges 72 so as to retain each race 14 during the initial movement of the loading member 30 as the fingers 32 deflect to grip the race aligned with the loading member. Each race 14 includes six partially circular ball grooves 76 equally spaced from each other in a circumferential relationship so as to define three diametrically opposed pairs of the grooves. Plates 70 defining the hopper workpiece channel are spaced far enough from each other so that the workpiece races 14 can slide downwardly therebetween but cannot rotate so that each race will be properly positioned for loading upon downward movement into alignment with the loading member 30. The workpiece channel defined by the plates 70 and flanges 72 in cooperation with the housing 42 is inclined with respect to the vertical at 60° such that one pair of the race grooves 76 is oriented in a vertically spaced relationship so as to receive the diametrically opposed upper and lower resilient fingers 32 as the loading member 30 is extended during the loading operation. As previously mentioned, the rigid locator 44 on the loading member 30 is received within the central race opening 46 where splines 82 thereof are located so as to cooperate with the fingers 32 in gripping and locating the race during the loading.

As seen by reference to FIG. 5, the blocking members 34 of the workpiece positioner are each mounted by an associated pin 84 in a pivotal manner on the housing 36 in which the loading member 30 is slidable supported. A mounting portion 86 of each blocking member 34 is received between a pair of mounting lugs 88 on the housing 36 as shown in FIG. 4 with the associated pin 84 extending therethrough and held in position by a lock screw 90 on the lower lug in order to maintain the pivotal support of the blocking members. Each blocking member 34 includes an associated spring 92 as illustrated by the one shown in FIG. 5 with its one end seated in a hole in the blocking member and its other end seated by a plunger 94. Springs 92 bias their associated plungers into engagement with the housing 42 on which housing 36 is mounted and thereby bias the blocking members 34 about their associated pins 84 to a blocking position where blocking portions 96 thereof block movement of the workpiece race 14 during gripping thereof by the resilient fingers 32 illustrated in FIG. 4. After the loading member 30 has moved sufficiently in the loading direction such that the resilient fingers 32 have fully gripped the workpiece race 14 within the aligned pair of grooves 76, an axial shoulder 98 of the loading member engages the opposed axial surface of the workpiece race and thereafter moves the race with the loading member such that the blocking members pivot against the bias of their associated springs 92 to nonblocking positions as the plungers 94 are retracted such that the blocking portions 96 move out of the path of movement to permit passage of the race therebetween and loading thereof on the grinding machine. After clamping of the loaded race 14 by a rotatable holder of the grinding machine, the loading member 30 is retracted so that grinding can commence after the resilient fingers 32 and the rigid locator 44 have disengaged the race.

As seen in FIG. 4, loading member 30 has a cross section with spaced side surfaces 100 capable of passing between the blocking members 34 during the extending movement that provides loading of the workpiece race. A slide surface 101 of the loading member 30 has a curved cross section extending between the top extremities of the two upper side surfaces 100 and is engaged during the extending movement of the loading member by the next workpiece race 14 to be loaded in order to prevent the races within the hopper 16 from sliding downwardly. Upon retraction of the loading member 30 to the position shown in FIG. 5, the workpiece races 14 are free to move downwardly such that the lower one moves into alignment with the resilient fingers 32 and the rigid locator 44 of the loading member in preparation for the next loading cycle. A key 102 seen in FIG. 4 is secured to the housing 36 within a slot 103 and slidably engages the lower right side surface 100 of the loading member to prevent rotation thereof and maintain the alignment of the fingers 32 and race grooves 76 necessary for gripping of the race.

Figure 7:
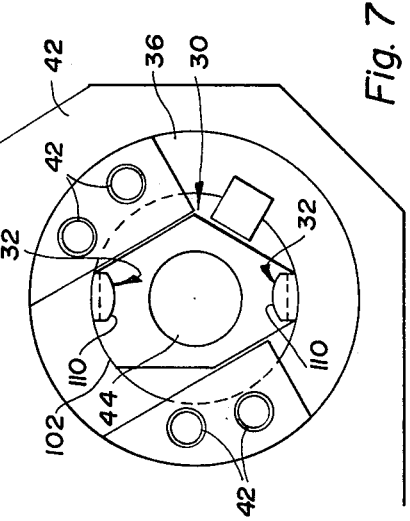
FIG. 7 is a view taken along line 7—7 of FIG. 6 in an endwise direction to the loading member on which the resilient fingers and rigid locator are mounted.

With reference to FIGS. 6 and 7, each resilient finger 32 has an elongated shape extending parallel to the axis of the loading member 30 with one end 104 thereof secured to the loading member by a pair of associated bolts 106. An intermediate portion 108 of each resilient finger 32 has a reduced size while a distal end 110 thereof has a curved surface (FIG. 7) especially adapted to be received within and grip a ball groove of an inner race for a constant velocity universal joint. The reduced size of the intermediate finger portion 108 permits the distal end 110 thereof to be resiliently movable with a sufficiently small force for any given extent of deflection so that size tolerances in the spacing between the workpiece race grooves can be accommodated for while still providing secure gripping of the races in the manner described.

As seen in FIG. 6, a switch actuator carrier 112 has one end secured by bolts 114 within a recess 116 in the end of the loading member 30 opposite the fingers 32. Another end of the carrier 112 includes an arm 118 welded thereto in a perpendicular relationship and carrying an extension limit switch actuator 120 and a retraction limit switch actuator 122. Each of the limit switch actuators 120 and 122 has a threaded stud and lock nut construction so as to be adjustable on the carrier arm 118 in order to adjust the position at which extension and retraction of the loading member are terminated by limit switch actuation.

As seen in FIG. 1, an extension limit switch 124 is mounted by a welded plate support 126 on the arm 62 which supports the cylinder 48. Extending movement of the loading member 30 by the cylinder 48 as the loading takes place moves the switch actuator 120 toward a tripper 128 of limit switch 124 until engagement and consequent actuation thereof operates this switch so as to thereby terminate the extending movement by conventional circuitry. Thereafter, retracting movement of the loading member 30 by the cylinder 48 moves the retraction limit switch actuator 122 shown in FIG. 6 toward one end 130 of a lever 132. As seen in FIG. 8, an intermediate portion of the lever 132 is mounted by a vertical pin 134 on a plate 136 that is secured to the support arm 62. Another end 138 of lever 132 on the opposite side of the pin 134 carries a switch actuator 140 with an adjustable threaded stud and nut construction. A retraction limit switch 142 is mounted by a welded plate support 144 on arm 62 as shown in FIG. 1 and includes a tripper 146 positioned adjacent the actuator 140 on the lever end 138. Upon a predetermined extent of loading member retraction by the cylinder 48, the actuator 122 shown in FIG. 6 pivots the lever end 130 sufficiently counterclockwise about pin 134 shown in FIG. 8 such that the actuator 140 trips the limit switch 142 in order to thereby terminate the retraction through the control circuitry. Thus, the switches 124 and 142 and their associated actuators cooperate to provide control of the extension and retraction of the loading member 30 by the cylinder 48 during the loading operation previously described.

Loader 10 includes a fixed base 148 of a bolted plate construction, as shown in FIG. 2, and also includes a movable carriage 150 which supports the housing 42 on which the hopper and the loading member housing are mounted. A pivotal connection 152 of the loader supports the carriage 150 on the fixed base 148 for movement about an axis A between a use position as indicated by solid line representation in FIG. 8 and an access position as indicated by phantom line representation in order to permit a machine operator to have access to the associated grinding machine components for maintenance and/or repair. Pivotal connection 152 includes a pin 154 that extends vertically coaxial with axis A. Distal upper and lower ends of the pin 154 are respectively received by upper and lower bearings 156 and 158 mounted on the fixed base 148. Inwardly from its distal ends, the pin 154 extends through upper and lower lugs 160 and 162 and is axially fixed with respect thereto by associated lock screws 164. Lugs 160 and 162 are fixed on a plate 166 of carriage 150 in order to provide the pivotal support of the carriage on the fixed base 148.

In the use position illustrated in FIG. 2, an adjustable positioner 168 accommodates for any slot of the pivotal connection 152 in order to properly locate the carriage 150 on the fixed base 148 with respect to the associated grinding machine. Positioner 168 includes a threaded stud 170 with one end received by a threaded hole in a lug 172 on the movable carriage housing 42 and with another end that is engageable with a plate 174 of the fixed base 148. A suitable screwdriver slot or wrench opening is provided in the upper end of the stud 170 so as to permit rotational adjustment thereof in order to thereby move the housing 42 upwardly or downwardly as permitted by the slot in the pivotal connection 152 and thereby provide the proper alignment of the loader with respect to the grinding machine. A lock nut 176 on the stud 170 is torqued into engagement with the lower side of the lug 172 in order to fix the stud after threading adjustment thereof to the proper position.

With reference to FIGS. 1 and 2, the unloading chute 20 of the loader has an upper end mounted on the fixed base 148 and extends downwardly therefrom in an inclined orientation such that a ground workpiece received by the chute slides downwardly therealong to an unshown storage bin. Chute 20 includes fixed sidewalls 178, a fixed floor 180, and a movable floor section 182 that cooperates with the sidewalls at the upper end of the chute to define a channel along which ground workpieces are delivered from the grinding machine. A mounting plate 184 secured to one of the chute sidewalls 178 in any suitable manner supports a cylinder 186 whose piston connecting rod 188 is secured to a connector 190 which is fixed to the movable floor section 182 extending through an elongated slot 192 in the fixed floor 180. Extension of the cylinder rod 188 moves the upper floor section 182 from a retracted position upwardly toward the right to an unload position so as to ensure that the unloading chute will receive a ground part dropped from the grinding machine 12 after completion of the grinding operation. As such, the movable floor section 182 of the unloading chute prevents the ground parts from falling downwardly between the grinding wheel 18 and a dressing wheel 194 of the grinding machine. After the ground workpiece is released to drop onto the unloading chute and slide downwardly therealong for delivery, the movable floor section 182 is moved from the unload position downwardly toward the left to a retracted position by retraction of the cylinder rod 188. Suitable unshown limit switches and conventional control circuity control the operation of the cylinder 186 such that the movable floor section 182 is properly located in both its unload and retracted positions.

With combined reference to FIGS. 1 and 2, the fixed floor section 180 includes a lower end having vertically extending plates 196 of elongated shapes. Nut and bolt supports 198 extend through the fixed sidewalls 178 of the chute and through suitable openings in the upper and lower ends of the plates 196 as well as through spacers 200 that space the plates from each other. Grinding lubricant received by the chute from the grinding machine drains downwardly therealong toward the storage bin until reaching the spaced plates 196 where the lubricant falls downwardly between the plates for collection in a suitable pan. Thus, the spaced vertically extending plate construction of the chute at its lower end prevents grinding lubricant from draining into the storage bin that receives the ground workpieces.

As also seen in FIG. 2, the upper end of the movable floor section 182 includes a slot 202 defining a bifurcated shape thereof so as to permit the grinding wheel 118 (FIG. 1) to move from its position at the right toward the left as shown in FIG. 1 to perform a grinding operation without interference with the chute. At its lower end 204, the movable floor section 182 is positioned adjacent the upper ends of the plates 196 in the retracted position and is positioned upwardly therefrom in its extended position so as to define a slight step with the fixed floor section 180 over which the movable floor section is slidably supported. Thus, the ground workpieces must negotiate this slight step during passage along the chute. Also, at the lower end of the spaced plates 196, a nut and bolt connection 206 supports a distal floor section 208 over which the workpieces pass just prior to exiting the chute.

While the best mode for carrying out the present invention has herein been described in detail, those familiar with the art to which this invention relates will recognize various alternative modes for practicing the invention as defined by the following claims.

What is claimed is:

1. A grinding machine loader comprising: a fixed base; a movable carriage; a pivotal connection that supports the carriage on the fixed base for movement about a vertical axis between a use position and an access position that allows access to the grinding machine with which the loader is used, a loading member including a resilient finger, said loading member being mounted on the carriage for movement with respect thereto in a loading direction such that the resilient finger engages a workpiece to be ground during such movement and deflects so as to grip the workpiece, and a workpiece positioner that is mounted for movement on the carriage and resiliently biased with a sufficient force to counteract the force applied to the workpiece by the finger deflection such that the positioner blocks movement of the workpiece during the initial gripping thereof by the finger, the loading member movement thereafter moving the gripped workpiece against the bias of the positioner to provide loading thereof in preparation for grinding.

2. A loader as in claim 1 further including a cylinder mounted on the carriage and having a piston connecting rod that extends to move the loading member in the loading direction, and said piston connecting rod of the cylinder retracting to move the loading member in an opposite direction after loading of the workpiece.

3. A loader as in claim 2 further including a hopper that is mounted on the carriage and feeds workpieces to be ground into alignment with the loading member for loading thereof upon extension of the cylinder rod.

4. A loader as in claim 3 wherein the loading member includes a slide surface that is engaged by the next workpiece within the hopper during loading of the prior workpiece.

5. A loader as in claim 4 wherein the hopper includes an orienter for ensuring that workpieces are properly oriented upon stocking the hopper.

6. A loader as in claim 1 or 5 wherein the loading member includes a rigid locator that cooperates with the resilient finger to grip the workpiece in an accurately positioned manner.

7. A loader as in claim 6 wherein the loading member includes a pair of the resilient fingers for cooperating with the locator to grip the workpiece.

8. A loader as in claim 6 wherein the positioner includes a blocking member and a spring that biases the blocking member to a blocking position with respect to the workpiece, and said spring deflecting to permit movement of the blocking member to a nonblocking position as the gripped workpiece is moved in the loading direction by the loading member.

9. A loader as in claim 8 which includes a pair of the blocking members mounted in a spaced relationship with respect to each other.

10. A loader as in claim 6 wherein the resilient finger includes an end mounted on the loading member, an intermediate portion of a reduced size, and a distal end with a curved surface especially adapted to be received within and grip a ball groove of an inner race for a constant velocity universal joint.

11. A grinding machine loader comprising: a loading member including a resilient finger, said loading member being movable in a loading direction such that the resilient finger engages a workpiece to be ground during such movement and deflects so as to grip the workpiece, a movable workpiece positioner that is resiliently biased with a sufficient force to counteract the force applied to the workpiece by the finger deflection such that the positioner blocks movement of the workpiece during the initial gripping thereof by the finger, the loading member movement thereafter moving the gripping workpiece against the bias of the positioner to provide loading thereof in preparation for grinding, and an unloading chute having a floor section movable to an unload position to receive a ground workpiece from an associated grinding machine and thereafter movable back to a retracted position in preparation for grinding of the next workpiece.

12. A loader as in claim 11 further including a cylinder having a piston connecting rod that moves the movable floor section of the unloading chute between the unload and retracted positions.

13. A loader as in claim 12 wherein the unloading chute includes a fixed floor section having vertically extending plates spaced from each other and cooperating to define a workpiece slideway that drains grinding lubricant received by the chute during the unloading operation.

14. A grinding machine loader comprising: a loading member including a rigid workpiece locator and a resilient finger, a cylinder having a piston connecting rod that extends to move the loading member in a loading direction, a hopper that feeds workpieces to be ground into alignment with the loading member such that the locator and finger engage the workpiece as the finger deflects to cooperate with the locator in gripping the workpiece, a positioner for locating the workpiece against movement upon the initial gripping thereof by the locator and resilient finger on the loading member, said positioner including a movable blocking member and a spring that biases the blocking member to a blocking position relative to the workpiece with a sufficient force to counteract the force applied to the workpiece by the finger deflection, the loading member movement thereafter moving the gripped workpiece against the bias of the blocking member spring to provide loading thereof in preparation for grinding, and an unloading chute having a floor section movable to an unload position to receive a ground workpiece from an associated grinding machine and thereafter movable back to a retracted position in preparation for grinding of the next workpiece.

15. A grinding machine loader comprising: a loading member including a rigid workpiece locator and a resilient finger, said resilient finger including an end mounted on the loading member and a reduced size intermediate portion as well as a distal end for gripping a workpiece to be loaded, a cylinder having a piston connecting rod that extends to move the loading member in a loading direction, a hopper that feeds workpieces to be ground into alignment with the loading member such that the locator and finger engage the workpiece as the finger deflects to cooperate with the locator in gripping the workpiece, a positioner for locating the workpiece against movement upon the initial gripping thereof by the locator and resilient finger on the loading member, said positioner including a movable blocking member and a spring that biases the blocking member to a blocking position relative to the workpiece with a sufficient force to counteract the force applied to the workpiece by the finger deflection, the loading member movement thereafter moving the gripped workpiece against the bias of the blocking member spring to provide loading thereof in preparation for grinding, and an unloading chute having a floor section movable to an unload position to receive a ground workpiece from an associated grinding machine and thereafter movable back to a retracted position in preparation for grinding of the next workpiece.

16. A grinding machine loader comprising: a loading member including a rigid workpiece locator and a resilient finger, a cylinder having a piston connecting rod that extends to move the loading member in a loading direction, a hopper that feeds workpieces to be ground into alignment with the loading member such that the locator and finger engage the workpiece as the finger deflects to cooperate with the locator in gripping the workpiece, a positioner for locating the workpiece against movement upon the initial gripping thereof by the locator and resilient finger on the loading member, said positioner including a movable blocking member and a spring that biases the blocking member to a blocking position relative to the workpiece with a sufficient force to counteract the force applied to the workpiece by the finger deflection, the loading member movement thereafter moving the gripped workpiece against the bias of the blocking member spring to provide loading thereof in preparation for grinding, a movable carriage that mounts the loading member and cylinder thereof as well as the hopper and the positioner, a fixed base, a pivotal connection that mounts the carriage on the fixed base for movement about a vertical axis between a use position and an access position that allows access to the grinding machine with which the loader is used, an unloading chute mounted on the fixed base and having a floor section movable to an unload position to receive a ground workpiece from the grinding machine and thereafter movable back to a retracted position in preparation for grinding of the next workpiece, and a cylinder having a piston connecting rod that extends and retracts to move the floor section of the unloading chute between the unload and retracted positions.

17. A grinding machine loader comprising: a loading member including a rigid workpiece locator and a resilient finger, said resilient finger including an end mounted on the loading member and a reduced size intermediate portion as well as a distal end for gripping a workpiece to be loaded, a cylinder having a piston connecting rod that extends to move the loading member in a loading direction, a hopper that feeds workpieces to be ground into alignment with the loading member such that the locator and finger engage the workpiece as the finger deflects to cooperate with the locator in gripping the workpiece, a positioner for locating the workpiece against movement upon the initial gripping thereof by the locator and resilient finger on the loading member, said positioner including a pair of movable blocking members and a pair of springs that respectively bias the blocking members to a blocking position relative to the workpiece with a sufficient force to counteract the force applied to the workpiece by the finger deflection, the loading member movement thereafter moving the gripped workpiece against the bias of the blocking member springs to provide loading thereof in preparation for grinding, a movable carriage that mounts the loading member and cylinder thereof as well as the hopper and the positioner, a fixed base, a pivotal connection that mounts the carriage on the fixed base for movement about a vertical axis between a use position and an access position that allows access to the grinding machine with which the loader is used, an unloading chute mounted on the fixed base and having a floor section movable to an unload position to receive a ground workpiece from the grinding machine and thereafter movable back to a retracted position in preparation for grinding of the next workpiece, the unloading chute including a fixed floor section having vertically extending plates spaced from each other and cooperating to define a workpiece slideway that drains grinding lubricant received by the chute during the unloading operation, and a cylinder having a piston connecting rod that extends and retracts to move the movable floor section of the unloading chute with respect to the fixed floor section thereof between the unload and retracted positions.

* * * * *